(12) United States Patent
Enyeart

(10) Patent No.: US 10,308,110 B2
(45) Date of Patent: Jun. 4, 2019

(54) FUEL TANK CAP AND MOUNTING BRACKET APPARATUS

(71) Applicant: Daniel Ray Enyeart, Gladstone, OR (US)

(72) Inventor: Daniel Ray Enyeart, Gladstone, OR (US)

( * ) Notice: Subject to any disclaimer, the term of this patent is extended or adjusted under 35 U.S.C. 154(b) by 265 days.

(21) Appl. No.: 15/387,672

(22) Filed: Dec. 22, 2016

(65) Prior Publication Data

US 2018/0178643 A1 Jun. 28, 2018

(51) Int. Cl.
*B60K 15/04* (2006.01)

(52) U.S. Cl.
CPC .. *B60K 15/0406* (2013.01); *B60K 2015/0432* (2013.01); *B60K 2015/0438* (2013.01); *B60K 2015/0451* (2013.01)

(58) Field of Classification Search
CPC ........ B60K 15/0406; B60K 2015/0432; B60K 2015/0438; B60K 2015/0451
See application file for complete search history.

(56) References Cited

U.S. PATENT DOCUMENTS

| 4,081,102 A * | 3/1978 | Sakai | ................. B60K 15/0406 |
| | | | 220/203.24 |
| 2007/0039963 A1* | 2/2007 | Krentz | ................... B60K 15/04 |
| | | | 220/298 |

* cited by examiner

*Primary Examiner* — Andrew T Kirsch
*Assistant Examiner* — Don M Anderson
(74) *Attorney, Agent, or Firm* — Ingrid McTaggart

(57) ABSTRACT

One embodiment of a fuel tank cap and mounting bracket apparatus includes a cap including protrusions on a lower surface of the cap, the protrusions including a raised portion adapted to be received within a recess of a mounting bracket to secure the cap to the mounting bracket. One embodiment of the mounting bracket includes slots to receive the protrusions of the cap and recesses to receive the raised portion of each protrusion. In one embodiment of the mounting bracket the slots and the recesses are surrounded by mounting bracket material on all sides so that the shape of the slots and recesses is protected against deformation during an impact, thereby inhibiting separation of the cap from the mounting bracket.

16 Claims, 5 Drawing Sheets

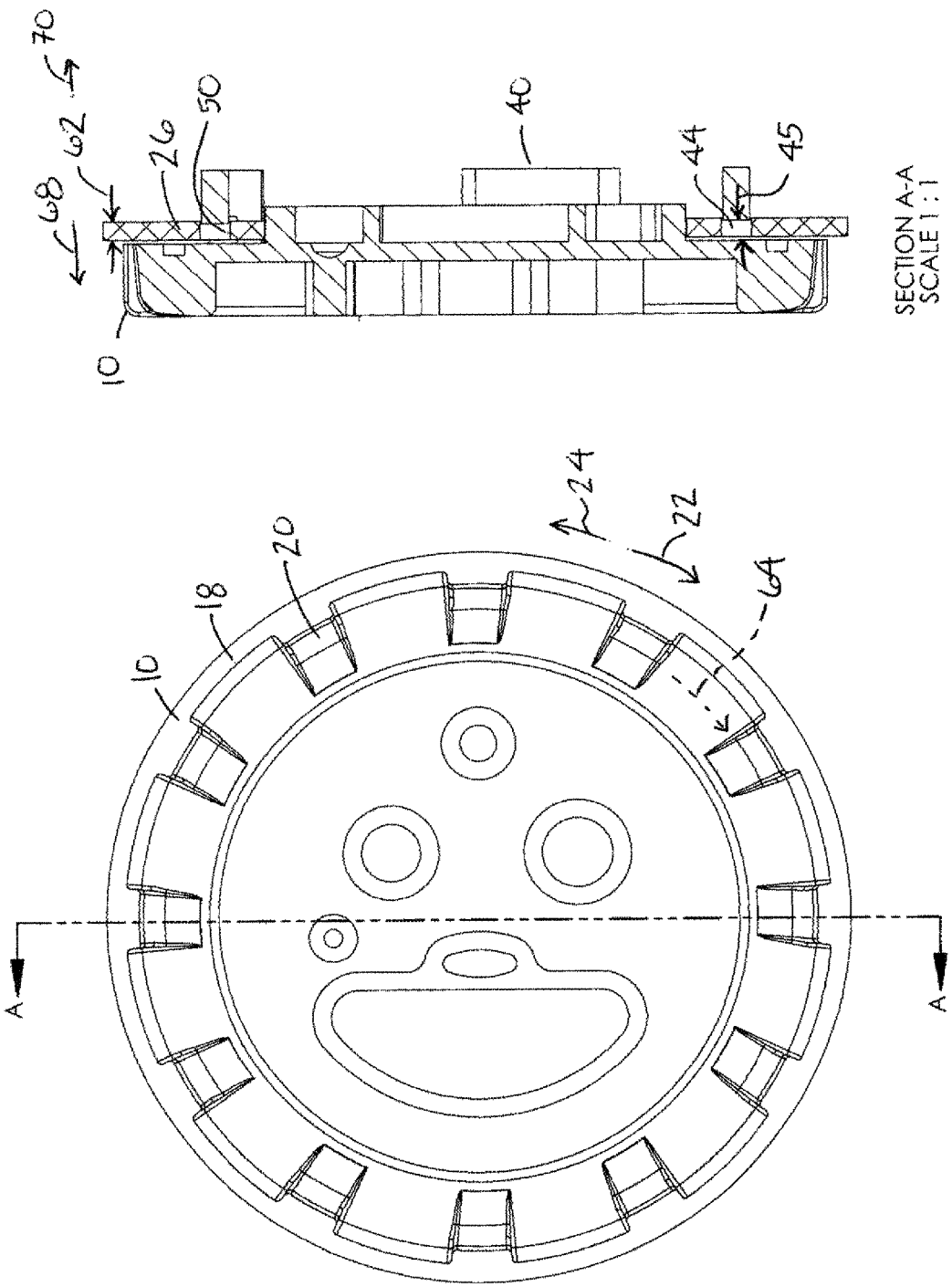

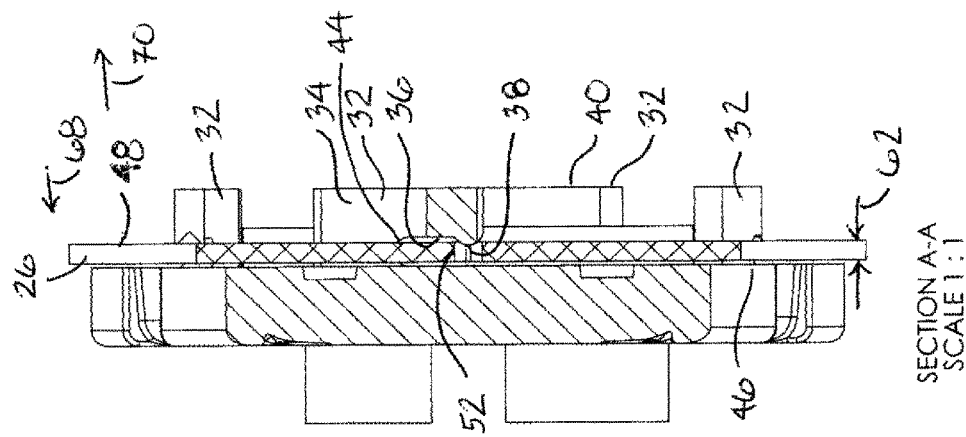
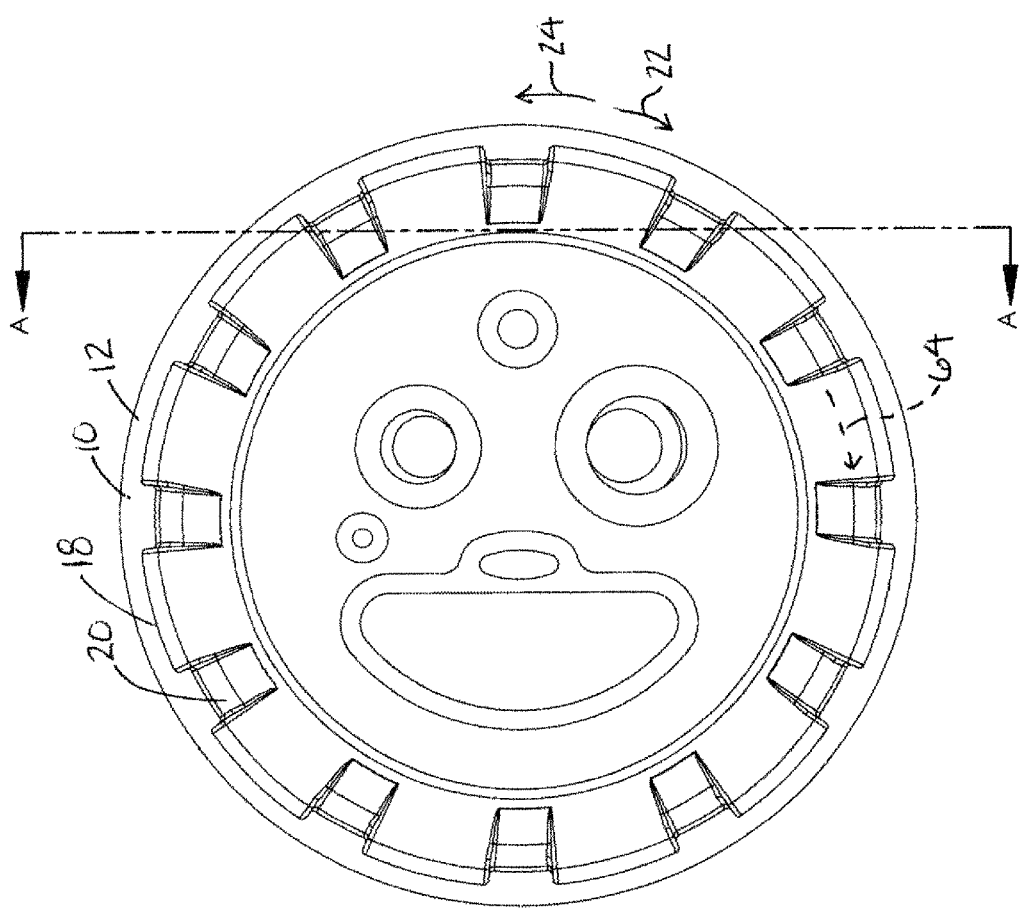
FIG. 5B
FIG. 5A

FUEL TANK CAP AND MOUNTING BRACKET APPARATUS

BACKGROUND OF THE INVENTION

The present invention is particularly intended for use on fuel tanks on commercial vehicles, although it may be used on any fuel tank connected to any type of engine. Fuel tanks typically include a cap that is secured to a mounting device, such as a mounting bracket. The connection between the cap and the mounting bracket may be sufficient to retain the cap in place during normal operating conditions. However, during impact conditions, such as a crash of the vehicle on which the cap is mounted, or during a drop test of the cap and mounting bracket assembly, the cap may be separated from the mounting bracket, resulting in spillage of the contents of the container, such as a fuel spill, which may result in a fire and/or an explosion.

In order to provide a more robust cap and mounting bracket assembly, so as to prevent separation of the cap from the mounting bracket, an improved cap and mounting bracket assembly is desired. There is a need, therefore, for an improved cap and mounting bracket assembly that will withstand the impact of a crash or a drop test of the cap and mounting assembly, but which is easy to install and manufacture.

SUMMARY OF THE INVENTION

One embodiment of a fuel tank cap and mounting bracket apparatus includes a cap including protrusions on a lower surface of the cap, the protrusions including a raised portion adapted to be received within a recess of a mounting bracket to secure the cap to the mounting bracket. One embodiment of the mounting bracket includes slots to receive the protrusions of the cap and recesses to receive the raised portion of each protrusion. In one embodiment of the mounting bracket the slots and the recesses are surrounded by mounting bracket material on all sides so that the shape of the slots and recesses is protected against deformation during an impact, thereby inhibiting separation of the cap from the mounting bracket.

BRIEF DESCRIPTION OF THE DRAWINGS

FIGS. 4A and 4B are a top view and a side cross sectional view, respectively, showing a cap secured on a mounting bracket, and in FIG. 4B showing protrusions of the cap positioned below the mounting bracket.

FIGS. 5A and 5B are a top view and a side cross sectional view, respectively, taken along a different cross sectional view line of FIGS. 4A and 4B, showing a cap secured on a mounting bracket, and in FIG. 5B showing protrusions of the cap positioned below the mounting bracket and with raised regions of the cap positioned within raised region receiving recesses of the mounting bracket.

DETAILED DESCRIPTION OF THE PREFERRED EMBODIMENTS

Figure 1:
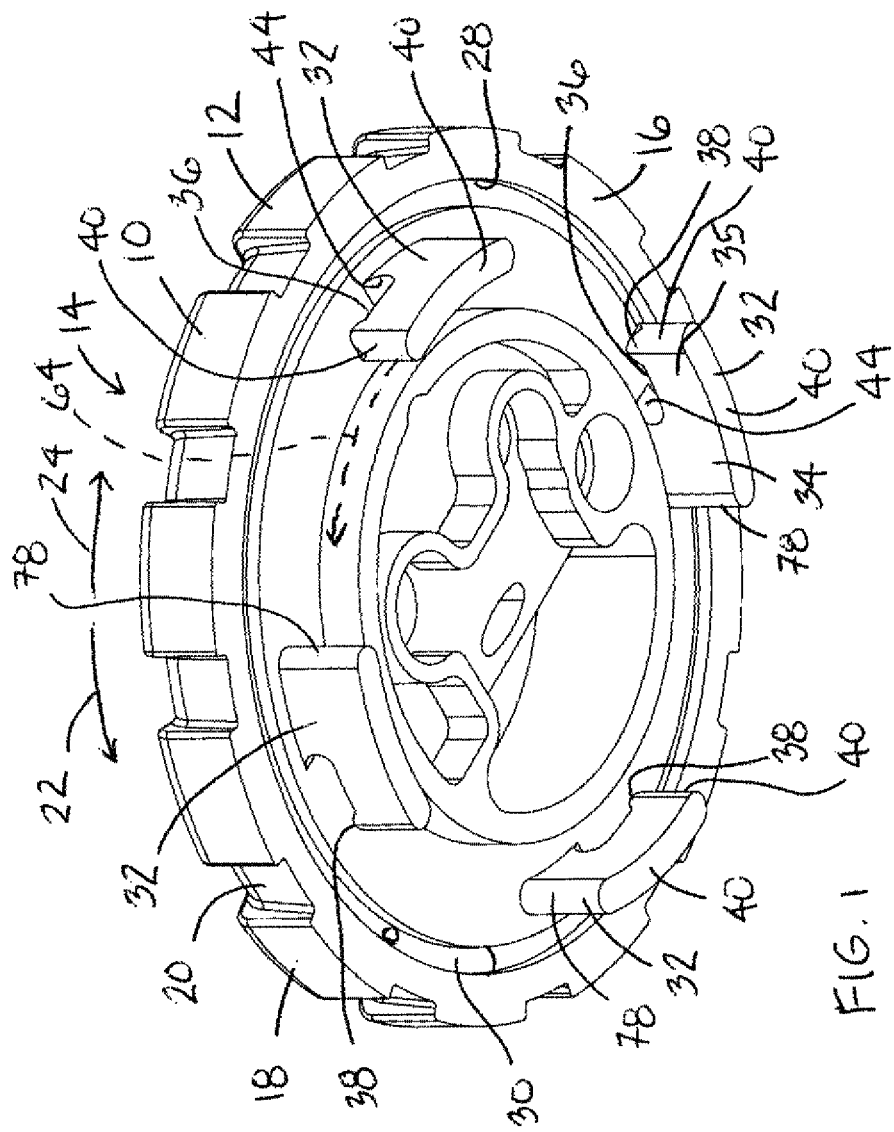
FIG. 1 is an isometric bottom view of one example embodiment of a cap of the assembly of the present invention.
Figure 2:
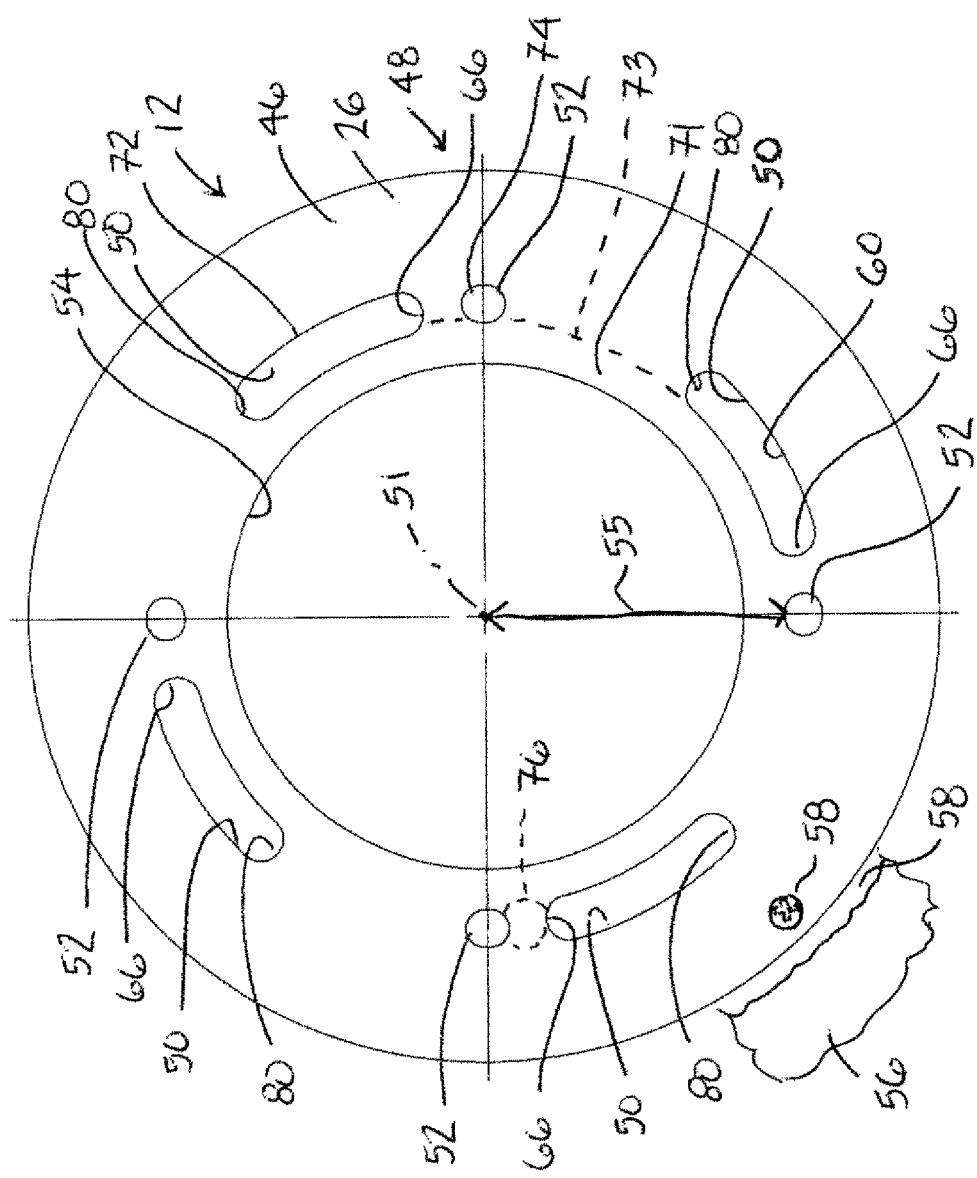
FIG. 2 is a plan view of one example embodiment of a mounting bracket of the assembly of the present invention.

FIG. 1 is an isometric bottom view of one example embodiment of a cap 10 of the assembly 12 of the present invention. Cap 10 includes an upper surface 14, a lower surface 16, and a side surface 18 positioned there between. Side surface 18 includes recessed regions 20 that facilitate gripping of the cap to turn the cap in a first direction 22 or in a second direction 24 so as to tighten or loosen the cap on a mounting bracket 26 (FIG. 2). Lower surface 16 may include a groove 28 that may receive an O-ring 30 therein (only a portion of the O-ring 30 is shown for ease of illustration), so as to form an air tight and/or fluid tight seal on the mounting bracket 26 (FIG. 2).

Lower surface 16 may further include a plurality of protrusions 32 extending downwardly from surface 16. In the embodiment shown surface 16 includes four protrusions 32 extending downwardly there from. Each of protrusions 32 may include a base region 34 secured on lower surface 16, and an outwardly extending side region 35 having an upper surface 36, or a locking surface 36, with a raised region 38 positioned at an end region 40 of locking surface 36 and extending upwardly toward lower surface 16. Protrusions 32 may each define an elongate, arcuate "footprint" 40 that is received within a corresponding elongate, arcuate slot 50 (FIG. 2) of mounting bracket 26 (FIG. 2). Protrusions 32 may also include a stop surface 44 that prevents over rotation of cap 10 on the mounting bracket 26 (FIG. 2).

Cap 10 and protrusions 26 may be formed as a single, integral structure by the process of molding, and may be manufactured of any suitable material, such as a metal, namely steel or aluminum, or a synthetic material, namely plastic.

FIG. 2 is a plan view of one example embodiment of a mounting bracket 26 of the assembly 12 of the present invention. Bracket 26 comprises an upper surface 46 and a lower surface 48. The bracket 26 also includes a plurality of slots 50 and apertures 52 arranged radially around a central axis 51 of a central aperture 54, each positioned at a radial distance 55 from central axis 51. In one embodiment the slots 50 and apertures 52 extend completely through bracket 26. In another embodiment, aperture 52 may comprise an upwardly extending recessed groove 52 in lower surface 48 of bracket, sized to receive raised region 38 (FIG. 1) of the cap 10, wherein upwardly extending recessed groove 52 does not extend completely through bracket 26. The bracket 26 may be secured to a container, such as a fuel tank 56 (only a portion shown for ease of illustration), by a fastener 58, wherein fastener 58 may be an adhesive, a weld, a fastener such as a bolt, or by any other securement structure as may be desired.

Referring now to FIGS. 3, 4A and 4B, and 5A and 5B, slots 50 and apertures 52 of bracket 26 may correspond in shape, size and arrangement with protrusions 32 of cap 10 so as to receive the protrusions 32 therein. In the embodiment shown, slots 50 define an elongate, arcuate slot that defines an opening 60 slightly larger than the footprint 40 (FIG. 1) of protrusions 32 so that individual ones of protrusions 32 may be received within slots 50. The thickness 62 of mounting bracket 26 may be slightly less than the length 45 (FIG. 4B) of stop surface 44 so that when cap 10 is lowered onto mounting bracket 26, and before the cap is secured in a locked position on bracket 26, locking surfaces 36 and raised regions 38 of individual ones of protrusions 32 (FIG. 1) will be positioned below lower surface 48 of bracket 26 (the uppermost portion of raised regions 38 will be positioned upwardly above lower surface 48 of the bracket 26 as the cap is moved into the locked position). In this position with locking surface 36 and raised regions 38 positioned below lower surface 48 of bracket 26, the cap 10 may be turned in first direction 22 so that raised region 38 of protrusion 32 will move along a circular path 64 (shown in dash lines) toward aperture 52. After a few degrees of rotation, raised region 38 will be aligned with aperture 52 and stop surface 44 will be positioned adjacent an end region 66 of slot 50. The O-ring 30 of cap 10 may bias cap 10 to move in an upward direction 68 so that the cap 10 may be pressed in a downward direction 70 onto mounting bracket 26 to fully seat protrusions 32 within slots 50 and to allow turning of cap 10 on mounting bracket 26. After the raised regions 38 are aligned with apertures 52, the cap may be released so as to allow the O-ring to bias the cap 10 in upward direction 68, so as to move raised regions 38 of protrusions 32 upwardly and into apertures 52, thereby securing cap 10 on mounting bracket 26. In this secured position the biasing force of the flexible member or O-ring 30 will hinder cap 10 from turning in direction 24 because to turn in direction 24, raised regions 38 must be moved downwardly and out of apertures 52.

Referring again to FIG. 2, slots 50 and apertures 52 extend completely through bracket 26 and are each surrounded with bracket material completely around a perimeter 72 of each slot 50 and completely around a perimeter 74 of each aperture 52. This material around each of slots 50 and apertures 52 will define a ring of material 71 around central aperture 54, shown as the region extending from the circumferential dash line 73 radially inwardly to the edge of central aperture 54, such that aperture 54 is a smooth, round aperture 54 that may easily and smoothly receive a fitting or a fuel nozzle into fuel tank 56. The material that surrounds each of slots 50 and apertures 52 provides strength and stability to each of slots 50 and apertures 52 such that during a collision or during a drop test of the fuel tank 56, the slots 50 and apertures 52 will retain their shape and will retain the cap 10 on the mounting bracket 26. In particular, in a locked position of cap 10 on mounting bracket 26, locking surface 36 (FIG. 1) of protrusion 32 will be positioned underneath a locking region 76 of material of mounting bracket 26 positioned between individual ones of slots 50 and apertures 52, such that material 76 (shown as a region outlined in dash lines) will prevent cap 10 from moving upwardly and away from mounting bracket 26. Similarly, during a collision or an impact test, material 71 positioned around central aperture 54 will prevent slots 50 and apertures 52 from deforming so that locking surfaces 36 of each of protrusions 32 will be retained with the slots 50 and cap 10 will be prevented from moving upwardly and away from mounting bracket 26.

Figure 3:
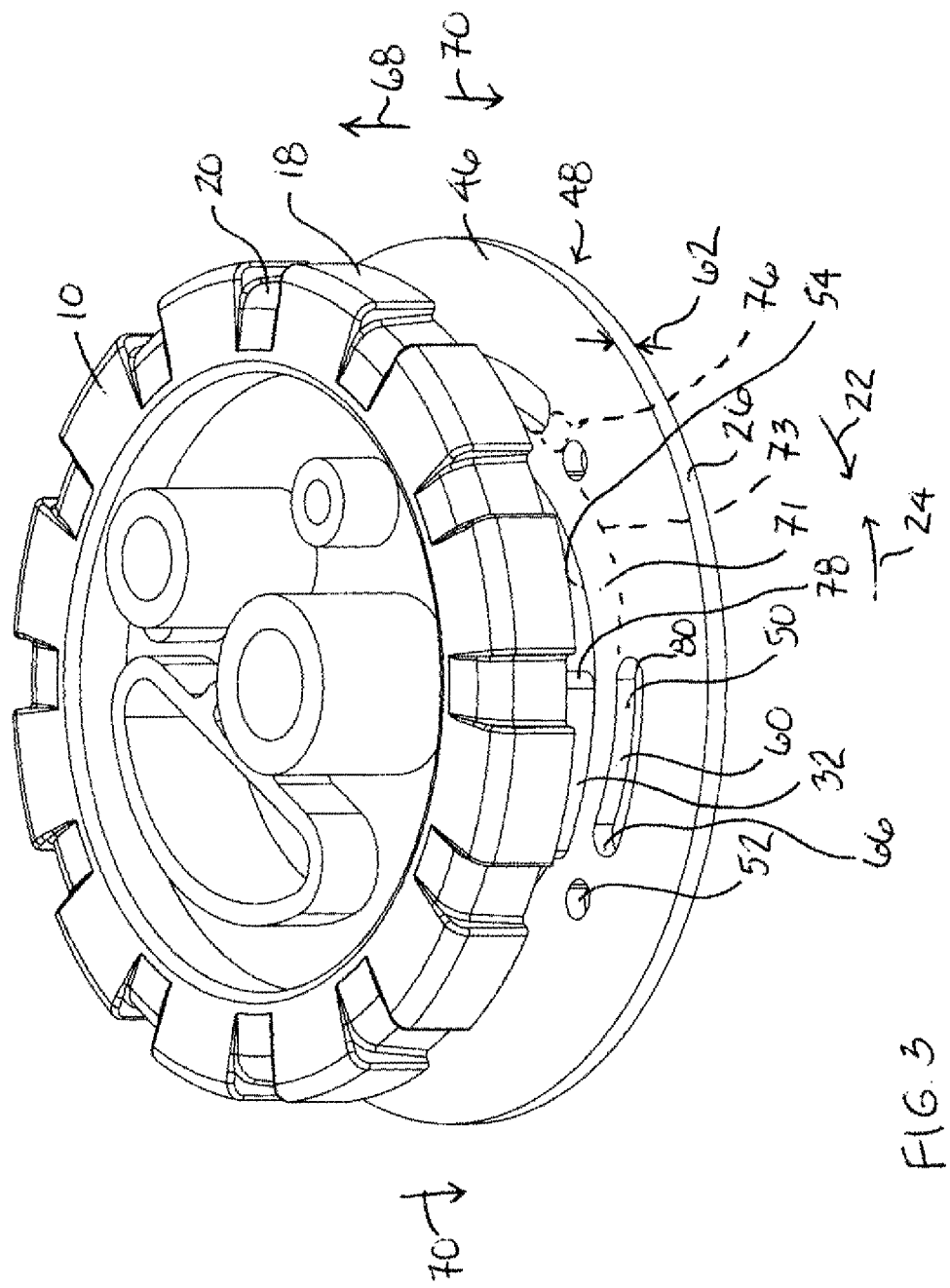
FIG. 3 is an isometric top view of the cap of FIG. 1 aligned to be received on the mounting bracket of FIG. 2.

FIG. 3 is an isometric top view of the cap 10 of FIG. 1 aligned to be received on the mounting bracket 26 of FIG. 2. In this position cap 10 is positioned with protrusions 32 aligned with and above slots 50. The cap 10 is moved in the downward direction 70 until O-ring 30 (FIG. 1) contacts upper surface 46 of bracket 26. The cap is then pushed down onto bracket 26 slightly further in direction 70, compressing O-ring 30 slightly, so that locking surface 36 (FIG. 1) is positioned below the lower surface 48 of bracket 26. The cap 10 is then turned in first direction 22 until raised regions 38 are each aligned with a corresponding aperture 52 and stop surfaces 44 are adjacent corresponding ones of end regions 66 of slots 50. The cap 10 is then released, allowing O-ring 30 to bias the cap 10 slightly upwardly in direction 68, such that raised regions 38 are each captured by individual ones of apertures 52. In this secured position, regions 76 of material of bracket 26 will prevent locking surface 36 of cap 10 from moving upwardly away from bracket 26, and regions 71 of material of bracket 26 will prevent protrusions 26 from moving sideways out of slots 50. Moreover, region 71 of material of bracket 26 will provide a robustness to the shape of central aperture 54 such the material in region 71 will ensure that each of slots 50 will be prevented or hindered from merely bending upwardly and releasing protrusions 32 and thereby allowing cap 10 to be separated from mounting bracket 26.

To remove cap 10 from bracket 26, the cap is pressed downwardly in direction 70 so as to slightly compress O-ring 30, and the cap is then turned in second direction 24 such that raised regions 38 are removed from corresponding ones of apertures 52. The cap 10 is turned in second direction 24 until a back surface 78 of protrusions 32 contacts a second end region 80 of corresponding ones of slots 50. The cap is then moved upwardly in direction 68, decompressing O-ring 30, and allowing protrusions 26 to be removed from slots 50. In this separated or open position, cap 10 is removed from mounting bracket 26, such that fuel can be filled into tank 56 via central aperture 54, for example.

FIGS. 4B and 5B are side cross sectional views that show the cap of FIG. 1 secured on the mounting bracket 26 of FIG. 2. These views show raised regions 38 received within corresponding ones of apertures 52, thereby hindering rotation of cap 10 in second direction 24 to remove the cap 10 from the mounting bracket 26, stop surfaces 44 positioned adjacent corresponding ones of second end regions 80, and locking surfaces 36 positioned below corresponding ones of regions 76 of mounting bracket 26. In this position, O-ring 30 will frictionally engage the upper surface 46 of mounting bracket 26 thereby further hindering rotation of cap 10 in second direction 24 to remove the cap 10 from the mounting bracket 26. FIG. 4B shows an end view of two of protrusions 32 in slots 50 and FIG. 5B shows a side view of one of protrusions 32 in a slot 50 and raised region 38 in aperture 52.

In the above description numerous details have been set forth in order to provide a more through understanding of the present invention. It will be obvious, however, to one skilled in the art that the present invention may be practiced using other equivalent designs.

I claim:

1. A fuel tank mounting bracket assembly, comprising:
a cap including a lower surface having a protrusion extending downwardly there from, the protrusion including a locking surface and a raised region both positioned on an upper surface of said protrusion; and
a mounting bracket including a central aperture and a slot both extending completely through said mounting bracket, said bracket further including a raised region receiving recess positioned adjacent said slot, said slot spaced from said central aperture and including mounting bracket material completely surrounding said slot, said slot sized to receive therein said protrusion, and said raised region receiving recess sized to receive therein said raised region of said protrusion to secure said cap on said mounting bracket,
wherein said cap includes a groove on said lower surface, said groove including an O-ring positioned therein, said groove and said O-ring both positioned radially outwardly of said protrusion of said cap.

2. The assembly of claim 1 wherein said slot defines an elongate, arcuate footprint radially positioned around a central axis of said central aperture of said bracket, and wherein said protrusion of said cap defines an elongate, arcuate footprint that corresponds in shape and size to be received within said slot of said bracket.

3. The assembly of claim 2 wherein said raised region receiving recess and said slot are both positioned at a predetermined radial distance from said central axis of said central aperture of said bracket.

4. The assembly of claim 1 wherein said a cap includes a plurality of protrusions extending downwardly from said lower surface, and wherein said mounting bracket includes a plurality of slots and raised region receiving recesses positioned radially around a central axis of said central aperture.

5. The assembly of claim 1 wherein said raised region receiving recess defines an aperture extending completely through said bracket.

6. The assembly of claim 1 wherein said mounting bracket includes a solid ring of material surrounding and defining said central aperture, and wherein said slot and said raised region receiving recess are spaced radially outwardly from said solid ring of material surrounding and defining said central aperture.

7. A fuel tank mounting bracket assembly, comprising:
a cap including a lower surface having a protrusion extending downwardly there from, the protrusion including a locking surface and a raised region both positioned on an upper surface of said protrusion; and
a mounting bracket including a central aperture and a slot both extending completely through said mounting bracket, said bracket further including a raised region receiving recess positioned adjacent said slot, said slot spaced from said central aperture and including mounting bracket material completely surrounding said slot, said slot sized to receive therein said protrusion, and said raised region receiving recess sized to receive therein said raised region of said protrusion to secure said cap on said mounting bracket,
wherein said slot is spaced from said raised region receiving recess to define a locking region of mounting bracket material there between, and wherein when said cap is in a locked position on said bracket said locking surface of said protrusion is positioned downwardly of said locking region of said bracket such that said locking region of said bracket is positioned between said locking surface of said cap and said lower surface of said cap.

8. A fuel tank assembly, comprising:
a fuel tank including a side wall having a tank aperture extending there through;
a fuel tank cap including a lower surface having a plurality of protrusions extending downwardly there from, the plurality of protrusions each including a base region secured to said lower surface of said cap and a side region extending outwardly from said base region, each of said side regions including a locking surface and a raised region both positioned on an upper surface of each of said side regions of said plurality of protrusions; and
a mounting bracket mounted on said side wall of said tank and including a central aperture, a plurality of recesses and a plurality of slots each aligned with said tank aperture wherein said central aperture and said plurality of slots each extend completely through said mounting bracket, said plurality of recesses each positioned adjacent corresponding ones of said plurality of said slots, said plurality of slots and recesses spaced from said central aperture and including mounting bracket material completely surrounding each of said plurality of slots and recesses, said plurality of slots each sized to receive therein corresponding ones of said plurality of protrusions, and said plurality of recesses each sized to receive therein corresponding ones of said raised regions to secure said cap on said mounting bracket and said fuel tank,
further including a flexible member secured to said cap, said flexible member defining an airtight seal between said cap and said mounting bracket when said cap is secured to said mounting bracket, said seal being positioned radially outwardly of said plurality of said protrusions of said cap,
wherein said plurality of slots and corresponding recesses each define there between a locking surface on a lower surface of said mounting bracket, and wherein said flexible member biases said lower surface of said cap upwardly and away from said mounting bracket when said cap is secured on said mounting bracket such that said flexible member biases said locking region of each of said plurality of protrusions into engagement with said locking surface of said mounting bracket.

9. The assembly of claim 8 wherein said flexible member biases said cap upwardly and away from said mounting bracket when said cap is secured on said mounting bracket such that said flexible member biases said raised region of each of said plurality of protrusions into corresponding ones of said plurality of recesses.

10. A fuel tank assembly, comprising:
a fuel tank including a side wall having a tank aperture extending there through;
a fuel tank cap including a lower surface having a plurality of protrusions extending downwardly there from, the plurality of protrusions each including a base region secured to said lower surface of said cap and a side region extending outwardly from said base region, each of said side regions including a locking surface and a raised region both positioned on an upper surface of each of said side regions of said plurality of protrusions; and
a mounting bracket mounted on said side wall of said tank and including a central aperture, a plurality of recesses and a plurality of slots each aligned with said tank aperture wherein said central aperture and said plurality of slots each extend completely through said mounting bracket, said plurality of recesses each positioned adjacent corresponding ones of said plurality of said slots, said plurality of slots and recesses spaced from said central aperture and including mounting bracket material completely surrounding each of said plurality of slots and recesses, said plurality of slots each sized to receive therein corresponding ones of said plurality of protrusions, and said plurality of recesses each sized to receive therein corresponding ones of said raised regions to secure said cap on said mounting bracket and said fuel tank,
wherein each of said plurality of protrusions defines an elongate, arcuate footprint and wherein each of said plurality of slots defines an elongate, arcuate footprint sized and positioned on said mounting bracket to receive therein corresponding ones of said plurality of protrusions of said cap.

11. A fuel cap securement structure, comprising:
a fuel cap including a lower surface having two protrusions extending downwardly there from, the two protrusions each including a base region and a side region extending outwardly from said base region, each side region including an upper surface including a raised region, and
a mounting bracket including a central aperture and two slots both extending completely through said mounting bracket, said bracket further including two raised region receiving recesses positioned adjacent said slots, said bracket including a ring of material spaced around said central aperture and including mounting bracket material completely surrounding said central aperture, said two slots and said two raised region receiving recesses positioned radially outwardly of said ring of material, said two slots sized to receive therein corresponding ones of said two protrusions, and said two raised region receiving recess sized to receive therein corresponding ones of said two raised regions of said cap to secure said cap on said mounting bracket, wherein said upper surface of said two protrusions each includes a locking surface, and wherein said mounting bracket includes a locking region positioned between each of said two slots and a corresponding one of said two raised region receiving recesses, and wherein said flexible member biases said locking surface of each of said two protrusions of said cap into engagement with said locking region of each of said two slots and said two raised region receiving recesses of said mounting bracket when said cap is in a locked position on said mounting bracket.

12. The structure of claim 11 wherein said mounting bracket includes a lower surface and wherein said two raised region receiving recesses are positioned on said lower surface of said mounting bracket.

13. The structure of claim 11 wherein said two raised region receiving recesses of said mounting bracket both extend completely through said mounting bracket.

14. The structure of claim 11 further comprising a flexible member secured on said lower surface of said fuel cap, said flexible member biasing said cap upwardly and away from said mounting bracket when said cap is secured on said mounting bracket.

15. The structure of claim 14 wherein said flexible member is positioned radially outwardly of said protrusions of said fuel cap.

16. The structure of claim 11 wherein said two slots and said two raised region receiving recesses are each positioned a predetermined radial distance from a central axis of said central aperture.

* * * * *